United States Patent [19]

Keller et al.

[11] 4,267,800
[45] May 19, 1981

[54] SUSPENDED WATERING SYSTEM FOR POULTRY HOUSE

[76] Inventors: Morris C. Keller; Francis Rustin, both of 2615 College St., Springfield, Mo. 65806

[21] Appl. No.: 125,205

[22] Filed: Feb. 27, 1980

[51] Int. Cl.³ .............................................. A01K 7/00
[52] U.S. Cl. ................................................... 119/72.5
[58] Field of Search ....................... 119/51.5, 72, 72.5, 119/74, 73, 81; 248/59, 60

[56] References Cited

U.S. PATENT DOCUMENTS

| | | | |
|---|---|---|---|
| 2,723,648 | 11/1955 | Logan | 119/81 |
| 2,865,328 | 12/1958 | Hostetler | 119/72 X |
| 3,664,305 | 5/1972 | Hart et al. | 119/72 |
| 3,724,425 | 4/1973 | Thompson | 119/72.5 X |
| 3,960,350 | 6/1976 | Tardoskegyi | 248/59 X |

*Primary Examiner*—Gene Mancene
*Assistant Examiner*—Robert P. Swiatek
*Attorney, Agent, or Firm*—Peter J. Murphy

[57] ABSTRACT

A drinker line consists of an assembly of prefabricated drinker sections of standardized construction. Each section includes a length of PVC pipe with a PVC pipe coupling attached to one end. A stiffening support consists of strips of sheet metal broken along its longitudinal center line to form a 60° V-shaped cross section. The stiffening support includes a support bar of that construction, disposed contiguous to the pipe with the pipe partially nesting in the channel of the support, and the bar being slightly shorter than the pipe to allow for mounting of couplings at both ends of the pipe. A short bridging bar of the same stiffening construction is nested with the support bar at the coupling end of the pipe in overlapping relation with the support bar, and extending beyond the coupling end of the assembly for nesting relation with the support bar of an adjacent drinker section after assembly. The pipe, support bar, and bridging bar are secured together to form the assembled drinker section by suitable band clamps. Each drinker section includes a plurality of longitudinally spaced drinker devices, such as drinker cups secured to the pipe by poultry operated drinker valves. The drinker sections are connected together utilizing screw clamps; and the continuous drinker line is suspended by means of hanger brackets and conventional drop cables of a cable winching system to adjust the elevation of the drinker line.

12 Claims, 8 Drawing Figures

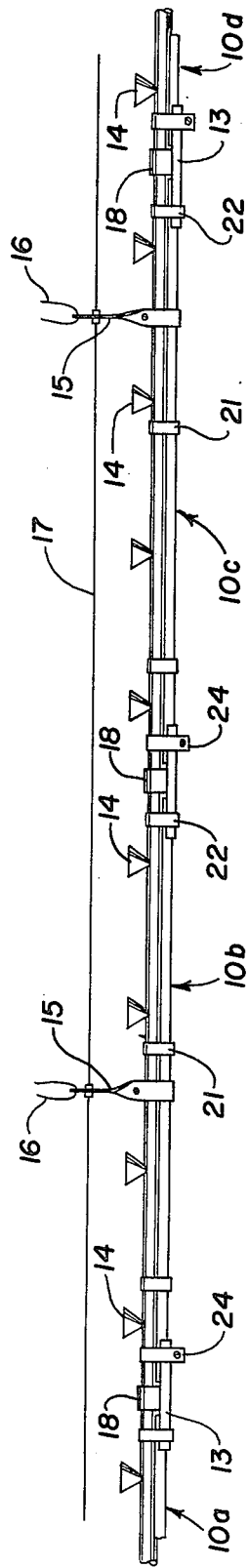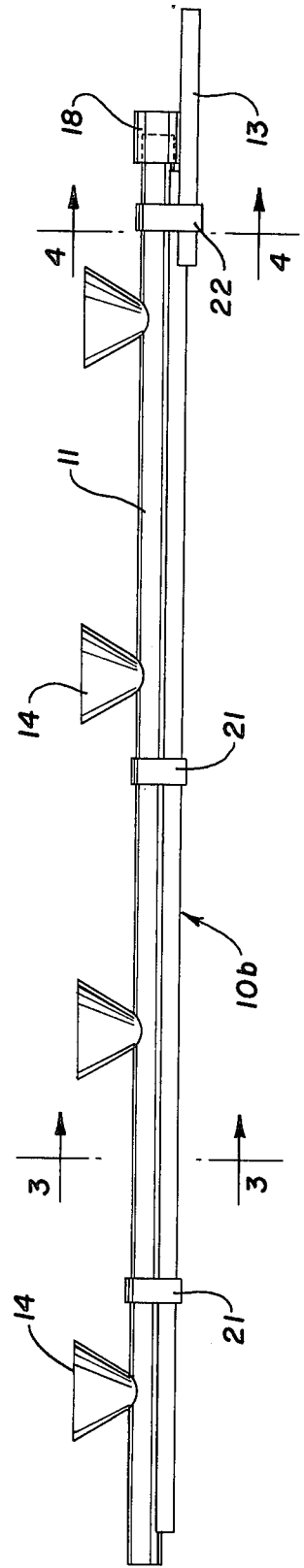

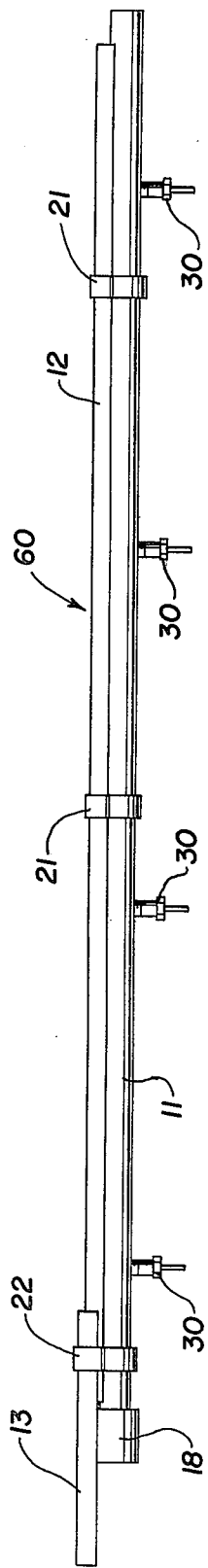
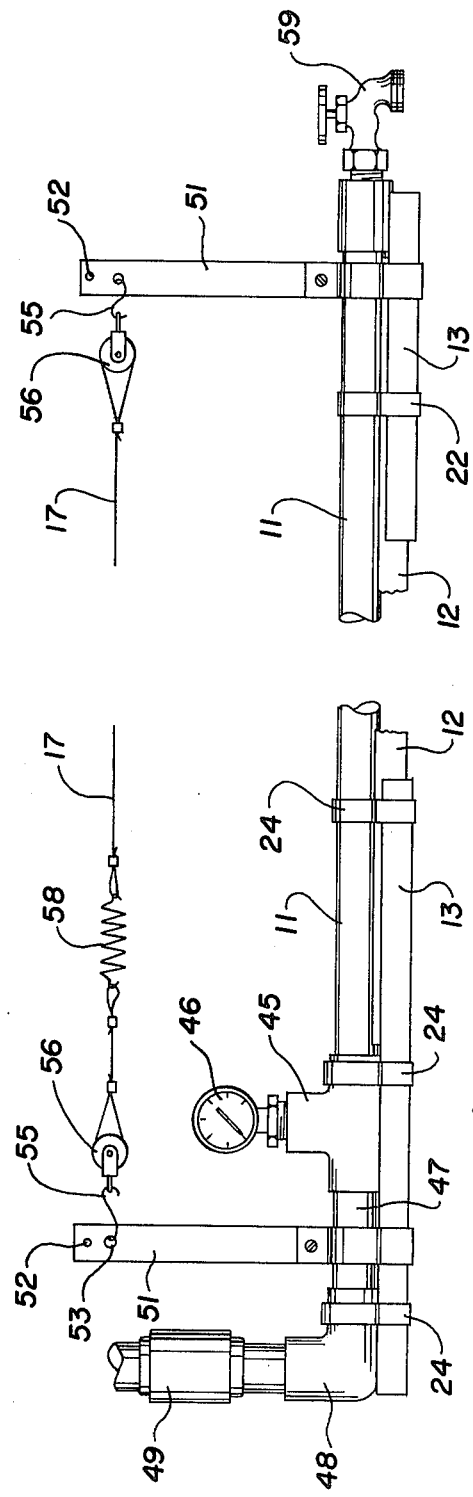

SUSPENDED WATERING SYSTEM FOR POULTRY HOUSE

BACKGROUND AND SUMMARY OF THE INVENTION

This invention relates to a suspended, adjustable height watering system for use in poultry houses; and more particularly to drinker line sections of such a watering system, which may be prefabricated for ease of system installation in the poultry house.

One object of this invention is to provide an improved suspended watering system which is designed for ease of fabrication and installation and, accordingly, to minimize the fabrication and installation costs.

Another object of this invention is to provide an improved suspended watering system which is fabricated from light weight materials to minimize the load supporting requirements in the poultry house and to provide for ease of operation and maintenance.

A further object of this invention is to provide an improved suspended watering system designed to utilize a light weight flexible pipe, such as PVC pipe, and provide the desired nonsagging support for that pipe with minimum suspension cables.

Still another object of this invention is to provide an improved suspended watering system of light weight and simple construction which eliminates water spillage and water leakage in the poultry house.

These objects are accomplished in a watering system which in an assembly of drinker sections prefabricated in a manner to be readily connected in end-to-end relation to form a continuous drinker line. Each drinker section includes a preselected length of a flexible pipe, with a coupling being secured to one end of the pipe for joining that pipe and its associated section to the pipe of an adjoining drinker section. A plurality of poultry operated drinker devices are mounted on the pipe in selected spaced relation to be supplied by the pipe. A support bar of selected length slightly shorter than the pipe, has a generally V-shaped cross section; and the support bar and pipe are clamped together with the pipe nesting partially within the channel of the support bar. A bridging bar having the same uniform, generally V-shaped cross section as the support bar, is disposed at one end of the drinker section in a manner to underlie the associated end of the support bar and the pipe coupling, and to extend beyond the coupling to underlie the support bar of an adjacent section. The bridging bar is disposed in nesting relation with the support bar and clamped to the support bar and pipe. Suitably spaced band clamps are provided for tightly clamping the pipe, the support bar, and the bridging bar together.

The novel features and the advantages of the invention, as well as additional objects thereof, will be understood more fully from the following description when read in connection with the accompanying drawing.

DRAWING

FIG. 1 is a view of a portion of a drinker line according to the invention;

FIG. 2 is a view of a drinker line section, for the drinker line of FIG. 1;

FIGS. 6 and 7 are detail views of the ends of the drinker line of FIG. 1; and

FIG. 8 is a view of an alternative form of drinker line section according to the invention.

DESCRIPTION OF THE PREFERRED EMBODIMENTS

Figure 3:
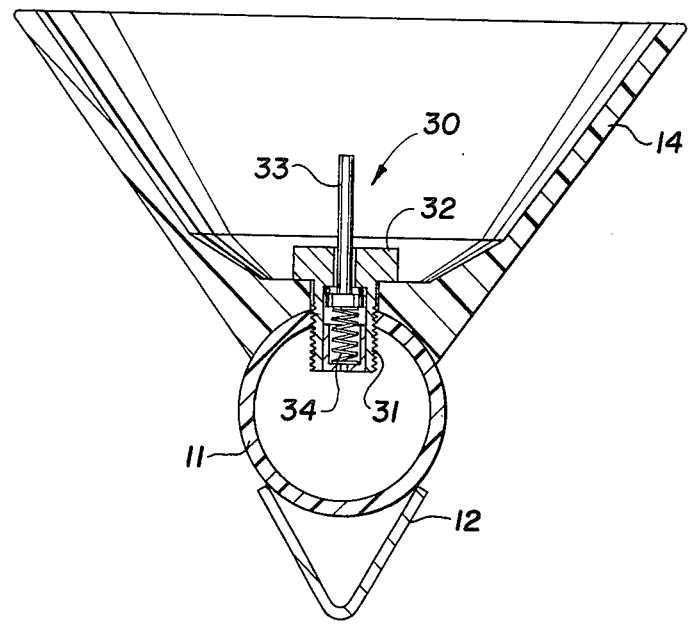
FIG. 3 is a sectional view taken along the line 3—3 of FIG. 2 illustrating a drinker cup and drinker valve.

FIGS. 1 through 7 of the drawing illustrate one form of watering system which is a continuous drinker line assembled from a plurality of drinker sections 10a, 10b, 10c and 10d. In general, this continuous line which is particularly illustrated in FIG. 1 consists of interconnected sections of water pipe 11 clamped to associated support bars 12 and 13 by suitable clamps. A plurality of drinker cups 14 and associated drinker valves are mounted on the top side of the pipe 11 in selected longitudinally spaced relation. The drinker line is supported from the superstructure of the poultry house by hanger brackets 15 secured to the drinker line at selected spaced intervals such as eight foot intervals. The hanger brackets are secured to the ends of suspension cables 16, which are a part of a supporting and winching system for suspending the drinker line at desired elevation from the floor. The hanger brackets 15 include suitable insulating means for supporting an anti-roost hot line 17 under tension in spaced relation about five inches above the pipe, for example. The hot line 17 is connected to a suitable source of electric energy, neither shown nor described further.

An important aspect of the invention is that the drinker line is assembled from a plurality of drinker sections 10 which may be conveniently prefabricated at a manufacturing plant, and which are designed for ready assembly at the installation site. This minimizes both the fabrication cost and the installation cost of the watering system. Preferably the drinker sections will be standardized sections to further minimize the fabrication cost. A preferred pipe material is polyvinyl chloride, referred to herein as "PVC".

Figures 4, 5:
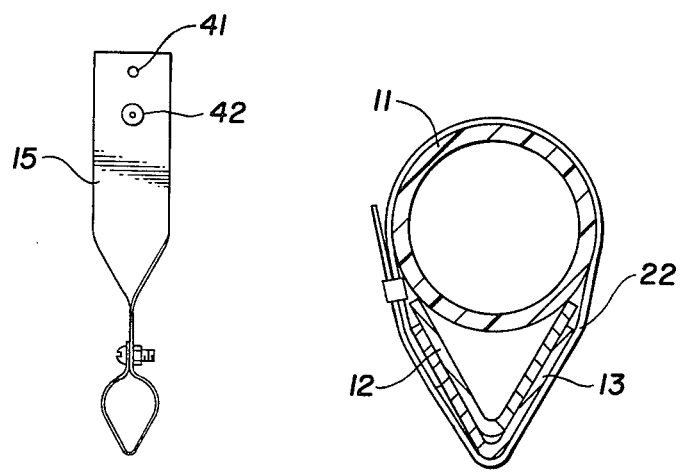
FIG. 4 is a sectional view taken along the line 4—4 of FIG. 2, illustrating the clamping of a bridging bar.
FIG. 5 is a detail view of a hanger bracket.

FIGS. 2, 3 and 4 of the drawing illustrate a typical drinker section 10b. This section is fabricated from a ten foot length of a flexible pipe 11, such as a ¾ inch PVC Schedule 40 pipe, which has a pipe coupling 18 secured at one end. This coupling is a standard PVC coupling secured to the pipe with PVC cement. The pipe 11 is secured in contiguous relation with a support bar 12 which has a length a few inches shorter than that of the pipe 11 to allow for the mounting of pipe couplings at both ends of the pipe. The support bar is fabricated, preferably, from a 1½ inch strap of 14 gauge galvanized steel, bent along the midline with a 120° break to form a member having a V-shaped cross section with an included angle of 60°. In assembled relation, the pipe 11 is nested in the channel face of the support bar 12; and these members are clamped tightly together by suitable clamps 21, such as air lock band clamps which may be applied with suitable powered equipment. These clamps are placed at selected spaced intervals.

A bridging bar 13 is secured to the above assembly at one end, underlying one end portion of the support bar 12. This bridging bar is fabricated from the same material as the support bar, and has a length of 8 inches for example. The bridging bar and support bar are nested together, with the bridging bar underlying the pipe coupling 18 and extending beyond the end of the coupling for nesting relation with the support bar of an adjacent drinker section. The bridging bar is secured to the assembly support bar and pipe by a suitable band clamp 22.

The section illustrated in FIG. 2 includes four drinker cups 14 which are uniformly spaced at 30 inch intervals, with the end cups being spaced 15 inches from the ends of the section. For an assembled drinker line, then, the cups would be uniformly spaced at 30 inch intervals. The cup spacing may be at selected intervals, from 12 inches to 30 inches for example; and this spacing would be dictated by the density of the birds to be housed in the particular poultry house.

The drinker cups 14 are preferably secured on the pipe 11 by associated drinker valves; and these drinker cups and drinker valves may be of any suitable design. FIG. 3 of the drawing illustrates a desired design of drinker cup and associated drinker valve. As seen in the drawing, the cup 14 has a generally conical shape with conical exterior and interior walls, and with a generally flat interior base wall for the seating of a portion of the drinker valve 30. The exterior of the cup base is provided with a transverse cylindrical surface having a diameter corresponding to the exterior diameter of the pipe 11 to provide for secure seating of the cup on the pipe.

The pipe is provided with threaded holes for receiving the threaded body of the valve 30. A desired form of valve has an elongated generally cylindrical body 31 externally threaded throughout a good portion of its length and having a hex head 32 at one end providing a transverse external shoulder for engaging and clamping the cup 14. Internally, the valve has a stepped bore defining a valve seat shoulder; and a valve closure member 33 consists of a head engaging the valve seat in sealing relation, and a stem extending through and projecting beyond the hex head end of the body. An internal biasing spring 34 maintains the valve closure member in the closed position. The closure member is tiltable by the birds to allow water to flow from the pipe 11 into the cup 14.

A typical drinker section, then, includes a length of pipe 11 with one coupling 18 secured at one end, the coupling end, a plurality of drinker cups secured to one side of the pipe by associated drinker valves, and a support bar and bridging bar which are secured to the pipe 11, in the desired underlying relation, by suitable band clamps 21 and 22. This drinker section might be a standarized section; and it will be seen that a large number of these drinker sections may be assembled in end-to-end relation to provide a drinker line of selected length. A single drinker line may be as long as 300 feet for example. When the drinker sections 10a, 10b, etc. are assembled at the site, two adjoining sections are placed in end-to-end relation in the desired orientation, PVC cement is applied to the coupling of one section and to the exposed pipe end of the adjacent section, and the two sections are then assembled together. When so assembled the bridging bar 13 of the one section now underlies the end of the support bar of the adjacent section; and the former extending end of the bridging bar is secured to the adjacent section by means of a suitable screw clamp such as a conventional adjustable hose clamp having a tightening screw. It will be seen then that the prefabricated sections 10a, 10b, etc. are readily assembled together at the installation site and when so assembled, the clamped support bars 12 and bridging bars 13 form a continuous stiffening bar or spine to minimize sag of the drinker line and enable support with a minimum number of suspension cables 16.

After assembly of a desired number of drinker sections, the hanger brackets 15 may be attached. FIG. 5 is an end view of a preferred form of hanger bracket, prior to assembly. This bracket is preferably fabricated from a strap of 16 gauge galvanized iron which may be 1 inch in width for example. The lower end of the bracket is formed to enclose the assembly of pipe and support bar, or the assembly of pipe, support bar and bridging bar, and configured so that the bracket may be clamped tightly around the assembly by means of a stove bolt and nut. Above this clamp portion, the hanger bracket is twisted 90° so that the plane of the upper portion of the bracket is transverse to the drinker line. A hole 41 is provided at the upper end of the bracket for receiving the suspension cable 16; and a second hole is provided beneath the hole 41 for receiving an insulating grommet 42 through which the hot line 17 is passed. These hanger brackets 15 are placed at desired spaced intervals; and for the construction of the drinker line as described above, the brackets may be spaced at 8 foot intervals, which provides for adequate support of the drinker line without sag. Preferably the hot line 17 is supported about five inches above the pipe 11.

The suspension system is conventional and consists of a winching cable system of ⅛ inch woven cable, for example, including cable drops from overhead pulleys spaced at the above mentioned 8 foot intervals. The lower ends of these cable drops 16 are threaded through the hanger bracket upper holes 41 and formed into an appropriate adjustable loop for precise height adjustment of the particular hanger bracket 15.

FIGS. 6 and 7 illustrate the control ends for a drinker line. FIG. 6 illustrates the supply end; and this supply end may be furnished in the form of a kit or a partially preassembled package ready for attachment to the non-coupling end of the first drinker section. Accordingly it is the non-coupling end of the first drinker section which would be placed adjacent to the water supply. As seen in FIG. 6 the components of the inlet control end include a tee coupling 45 for attachment to the end of the pipe 11, a pressure guage 46, a short pipe 47, an elbow 48 and a pressure regulator 49 for coupling to the water inlet pipe. Before assembly of this control end to the section 10, a bridging bar 13 would first be secured to the non-coupling end by a suitable screw clamp 24; and a second screw clamp 24 would be slipped over the end of the section prior to securing the tee to the pipe by means of PVC cement. This second screw clamp is then used to secure the tee to the bridging bar; and a third screw clamp 24 may secure the elbow to the bridging bar to assure a rigid assembly of this inlet control end.

An end hanger bracket 51 has a slightly different configuration from the above described brackets 15, being fabricated preferably from a 1¼ inch strip of 16 gauge galvanized iron. This bracket 51 has a screw clamp formed at its lower end in the same manner as the above described brackets; and this is secured around the bridging bar and the short pipe 47. This end hanger bracket has an upper hole 52 for receiving the loop of the suspension cable 16, and has a larger lower hole 53 for securing the end of the hot line 17.

By way of example this end of the hot line 17 is secured to the end bracket by means of an S hook 55 and an insulating pulley 56. In order to provide desired tension in the hot line, a tension spring 58 may be inserted in the hot line adjacent to the pulley 56.

FIG. 7 illustrates the tail end of the drinker line; and this is normally at the coupling end of a drinker section. The tail end consists merely of a faucet 59 secured to the section end by means of a suitable adapter. An end hanger bracket 51 is secured to this end of the drinker line adjacent to the faucet for supporting this end of the line in the manner previously described. The other end of the hot line 17 is secured to the end bracket in the same manner. This end of the hot line is secured around the insulating pulley and placed in desired tension, to just barely extend the tension spring 58 for example; and the hot line is then clamped by means of a suitable cable clamp at this insulating pulley.

FIG. 8 of the drawing illustrates the structure and orientation of a different form of drinker section 60 which might be used in a similar suspended watering system for a poultry house, or perhaps for other animals. The typical drinker section 60 is inverted from the above described section; and employs the same drinker valves 30 but without any drinker cups. These valves are operated by poultry or other animals which reach up to engage the exposed ends of the valves with their mouths and move the stem laterally to allow water to flow directly into the mouth. As best seen in FIG. 8, a typical drinker section 60 then includes a length of pipe 11 with a coupling 18 secured at one end which is the coupling end, a plurality of drinker valves secured to one side of the pipe in desired spaced relation, a support bar 12 which is substantially coextensive with the length of pipe 11 and overlying the pipe, and the bridging bar 13 which overlies the support bar and coupling 18, with the assembly being secured together by the suitable band clamps 21 and 22.

What has been disclosed is a novel suspended watering system for poultry houses, having a principal advantage of simple design which provides for ease of fabrication and ease of installation and which, further, utilizes standard components to lower manufacturing costs.

An important feature of the system is that it utilizes flexible PVC pipe and couplings which can be fabricated at reasonable cost, and utilizes an inexpensive and effective stiffening system fabricated from sheet metal.

An advantage of the system is that the major components, the pipe and the stiffening system, are assembled in a compact manner to minimize maintenance and particularly sanitation maintenance.

A related advantage of the system is that it enables the use of inexpensive flexible pipe, such as plastic pipe in association with an inexpensive stiffening system, to provide the desired non-sagging characteristics of the drinker line while at the same time minimizing the number of drop cables necessary to suspend the system.

An important feature and advantage of the system is that it enables the prefabrication of standarized drinker sections in a manufacturing facility, which has the effect of reducing manufacturing costs; and this inherently reduces substantially the on site installation costs particularly since the drinkers sections are designed for ready assembly in end-to-end relation to provide the continuous drinker line.

An ancillary advantage of the system is that it is well adapted for use with drinker devices which include a drinker cup and associated poultry operated drinker valve which coact together to eliminate any water spillage in the poultry house and the well known undesirable results of such water spillage.

While preferred embodiments of the invention have been illustrated and described, it will be understood by those skilled in the art that changes and modifications may be resorted to without departing from the spirit and scope of the invention.

What is claimed is:

1. In a watering system for poultry, for suspension from overhead supports, the improvement comprising
    a drinker section fabricated in a manner to be connected in end-to-end relation with a plurality of like drinker sections to form a continuous drinker line; each said drinker sections comprising
    a preselected length of flexible pipe; a coupling secured to one end of said pipe, for joining said pipe to the pipe of an adjoining drinker section;
    a plurality of poultry operated drinker devices mounted on said pipe to be supplied thereby; said drinker devices being mounted in longitudinal spaced relation on one side of said pipe;
    a support bar of preselected length, having a uniform, generally V-shaped cross section; said support bar being disposed in parallel contiguous relation with said water pipe, with said water pipe nesting partially within the channel of said bar; said support bar having a length sufficiently shorter than the length of said pipe to permit pipe overhang for securing of couplings to each end of said pipe;
    a bridging bar having the same uniform, generally V-shaped cross section as said support bar, said bridging bar being disposed at said one end of said section in a manner to underlie the associated end of said support bar and said coupling, and to extend beyond said coupling to underlie the support bar of the adjacent section; said bridging bar being disposed in nesting relation with said section bar; and longitudinally spaced clamp means for securing together said pipe, said support bar, said bridging bar to form a unitary drinker section.

2. In a watering system as set forth in claim 1, the improvement comprising
    said pipe and said coupling being fabricated from a plastic material.

3. In a watering system as set forth in claim 1, the improvement comprising
    said pipe and said coupling being fabricated from PVC, and being joined together with PVC cement.

4. In a watering system as set forth in claim 1, the improvement comprising
    said support bar and said bridging bar being fabricated from 14 gauge galvanized steel.

5. In a watering system as set forth in claim 1, the improvement comprising
    said support bar and said bridging bar having a V-shaped cross section; the walls of said support bar and said bridging bar being disposed at a 60° angle to each other.

6. In a watering system as set forth in claim 1, the improvement comprising
    said pipe comprising a 10 foot length of ¾ inch PVC pipe; said support bar being V-shaped in cross section with the walls being angled 60° from each other and extending laterally ¾ of an inch from the apex; and said support bar being fabricated from 14 gauge galvanized steel.

7. In a watering system, for suspension from overhead supports, the improvement comprising
    a continuous line of flexible pipe consisting of a plurality of pipe sections coupled in end-to-end relation by pipe couplings; and an associated stiffening support system consisting of elongated support bars disposed contiguous to, and being substantially coextensive in length with, said pipe sections, and bridging bars disposed contiguous to and overlapping adjacent support bars and bridging said couplings; and clamp means disposed at selected intervals for clamping together said pipe, said support bars and said bridging bars at each side of a pipe coupling, and for clamping together said support bars and pipe sections intermediate said pipe couplings;

said support bars and bridging bars being elongated rigid members having a V-shaped cross section; the channels of said support bars being disposed in nesting relation with said pipe sections; and said bridging bars being disposed in nesting relation with said support bars;

and a plurality of animal operated drinker devices mounted on said pipe sections in longitudinally spaced relation, to be supplied by said pipe.

8. In a watering system as set forth in claim 7, the improvement comprising said support bars and said bridging bars underlying said pipe sections and said pipe couplings; and said drinking devices comprising drinking cups secured to said pipe sections by respective drinking valves; said drinking valves having operator stems projecting upward from the base of said cups, disposed to be engaged by animals to release water into said cups.

9. In a watering system as set forth in claim 7, the improvement comprising said support bars and said bridging bars overlying said pipe sections and said pipe couplings; and said drinking devices comprising valves suspended from the lower side of said pipe sections opposite from said support bars; said valves including projecting operator stems, to be engaged by animals to release water from said valves.

10. In a watering system as set forth in claim 7, the improvement comprising said pipe sections and said pipe couplings being fabricated from plastic and being joined together with a suitable plastic cement.

11. In a watering system as set forth in claim 7, the improvement comprising said support bars and said bridging bars being fabricated from sheet metal formed to a V section with the walls disposed at 60° relative to each other.

12. In a watering system as set forth in claim 11, the improvement comprising said support bars and said bridging bars being fabricated from 14 gauge galvanized steel.

* * * * *

UNITED STATES PATENT AND TRADEMARK OFFICE
CERTIFICATE OF CORRECTION

PATENT NO. : 4,267,800
DATED : May 19, 1981
INVENTOR(S) : Morris C. Keller and Francis Rustin It is certified that error appears in the above-identified patent and that said Letters Patent are hereby corrected as shown below:

[76]  Inventors:  Morris C. Keller, 5145 Regatta Drive, Dallas, Texas 75232; Francis Rustin, 803 E. Woodland, Springfield, Missouri 65807

Column 6, line 33 change "section" to --support--.

Signed and Sealed this

Eighteenth Day of August 1981

[SEAL]

Attest:

GERALD J. MOSSINGHOFF

Attesting Officer    Commissioner of Patents and Trademarks